US010131328B2

(12) United States Patent
Breakfield

(10) Patent No.: US 10,131,328 B2
(45) Date of Patent: Nov. 20, 2018

(54) AUTOMATIC WHEEL CHOCKING SYSTEM FOR VEHICLES

(71) Applicant: Kenneth Breakfield, Columbia, MS (US)

(72) Inventor: Kenneth Breakfield, Columbia, MS (US)

( * ) Notice: Subject to any disclaimer, the term of this patent is extended or adjusted under 35 U.S.C. 154(b) by 0 days.

(21) Appl. No.: 14/999,778

(22) Filed: Jun. 27, 2016

(65) Prior Publication Data
US 2017/0369041 A1    Dec. 28, 2017

(51) Int. Cl.
*B60T 3/00*    (2006.01)

(52) U.S. Cl.
CPC ...................... *B60T 3/00* (2013.01)

(58) Field of Classification Search
CPC ........................................................ B60T 3/00
USPC .......... 188/32, 36, 60, 69, 4 R, 5, 6; 410/30, 410/49; 297/7; 104/249, 257, 258
See application file for complete search history.

(56) References Cited

U.S. PATENT DOCUMENTS

| | | | | | |
|---|---|---|---|---|---|
| 2,182,044 | A | * | 12/1939 | Ackerman | B60T 3/00 188/3 R |
| 2,483,048 | A | * | 9/1949 | Hergner | B60T 1/14 188/4 R |
| 2,522,104 | A | * | 9/1950 | Edwards | B60T 3/00 188/32 |
| 2,732,035 | A | * | 1/1956 | Besoyan | B60T 1/14 188/32 |
| 3,086,619 | A | * | 4/1963 | Grotz | B60T 3/00 188/4 R |
| 3,305,049 | A | * | 2/1967 | Willey | B60T 3/00 188/32 |
| 3,517,776 | A | * | 6/1970 | Martino | B60T 1/14 188/32 |
| 3,625,313 | A | * | 12/1971 | Lowrie | B60T 3/00 188/4 R |
| 3,902,574 | A | * | 9/1975 | Wright | B60T 1/14 188/36 |
| 4,354,580 | A | * | 10/1982 | Delasantos | B60T 1/14 188/4 R |
| 5,497,857 | A | * | 3/1996 | Warren | B60T 1/14 188/4 R |

\* cited by examiner

*Primary Examiner* — Thomas J Williams
*Assistant Examiner* — Mariano Sy

(57) ABSTRACT

A wheel chocking assembly for a vehicle such as a truck where the wheel chocks are supported in respective cradles mounted for rotation on the truck's frame or chassis, and where the cradles are adapted to be moved between a first upwardly-facing inoperative position where each cradle supports its corresponding chock in an inoperative mode, and an operative positon where each cradle is rotated about 180° sufficient to lower its corresponding chock by a tether into chocking position under the influence of gravity. A control system is provided where transition from the aforementioned inoperative position to the operative position is remotely controlled by operation of the vehicle's parking brake.

7 Claims, 3 Drawing Sheets

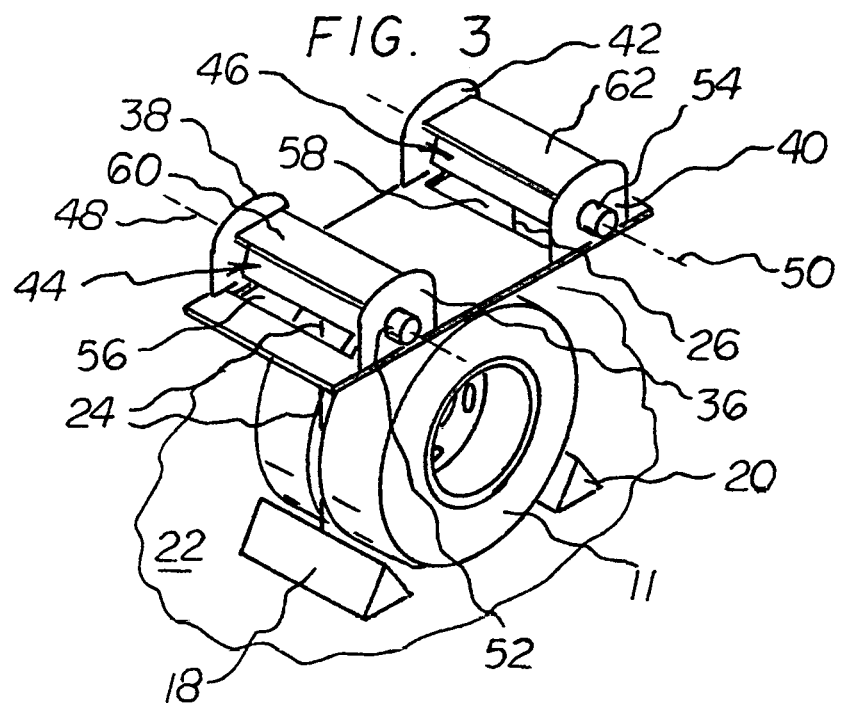
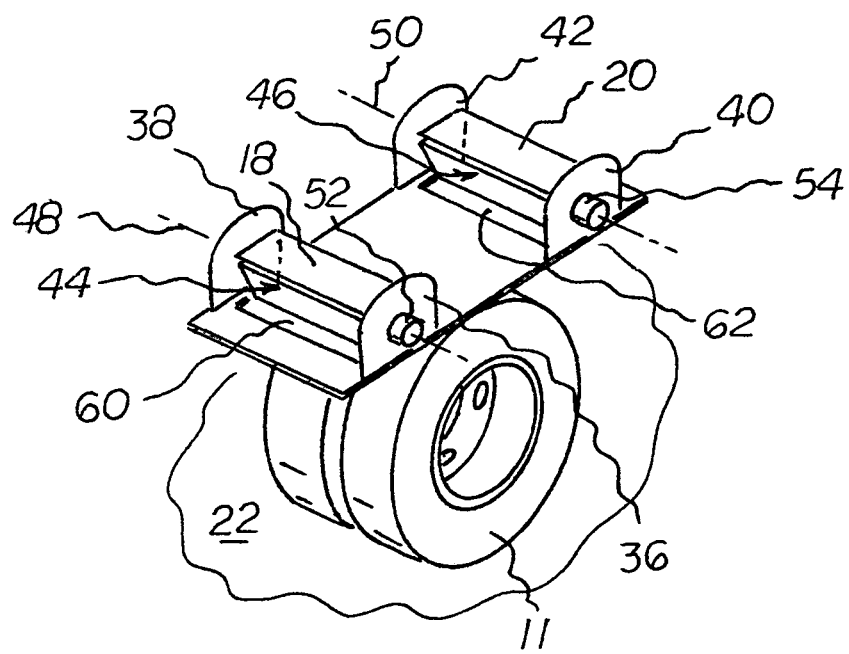

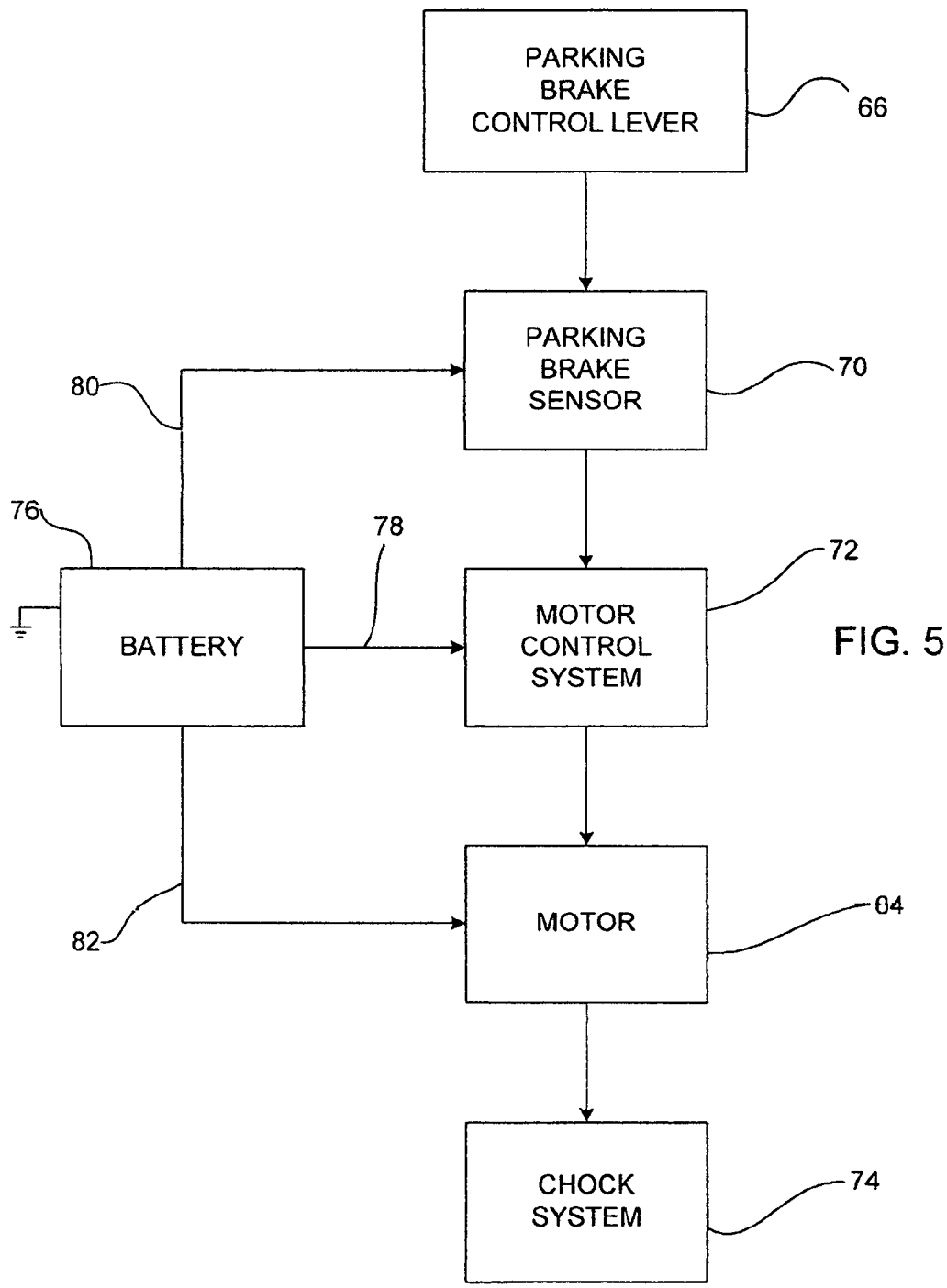

AUTOMATIC WHEEL CHOCKING SYSTEM FOR VEHICLES

The present invention relates generally to chocking devices and more particularly to a wheel chocking system for a large truck or the like.

The prior art describes many chocking devices or systems for trucks or similar vehicles. U.S. Pat. No. 2,483,048 (Hergner) discloses the general idea of providing a truck-mounted assembly having chocks for simultaneously engaging the front and rear of a pair of the truck's wheels. The chocks are mounted on separate, pivotal lever arms controlled by flexible cables adapted to be wound on a remote, lever-operated take-up drum, respectively. U.S. Pat. No. 3,086,619 (Grotz) discloses an automatically operable wheel chocking system mounted on a vehicle main frame and which is adapted for pivotal movement between an upward inoperative position and a lowered operative position. U.S. Pat. No. 3,305,049 (Willey) describes a power-operated chock for use on the wheel of a truck parked nearby. U.S. Pat. No. 3,321,046 (Cooper) shows a hand-crank-operated chock assembly mounted on the frame of a truck. U.S. Pat. No. 3,625,313 (Lowrie) shows a chock assembly pivotally mounted on the frame of a truck and operated by gravity. Both fore and aft assemblies are provided to engage opposite sides of the same wheel set simultaneously.

In contrast to the aforementioned prior art, the present invention, briefly summarized, provides an automatic wheel chocking apparatus for a large vehicle such as a truck where the wheel chocks are supported in respective cradles mounted for rotation on the truck's frame or chassis, and where the cradles are remotely controlled between a first inoperative upright or stowed position and a second operative position and where each cradle is rotated about an axis 180° degrees sufficient to lower its corresponding chock by a tether into chocking position on the ground against the wheels of the truck. The apparatus includes a motor responsive to engagement of the parking brake on the vehicle to activate the cradles for rotation causing the chocks to descend into operative engagement with a corresponding vehicle wheel or tire. When the parking brake is disengaged, the motor is reversed causing the chocks to be withdrawn into their respective cradles thereby permitting the truck to move.

Other objects and advantages will appear as the specification proceeds, and the novel features of the invention will be particularly pointed out in the appended claims.

BRIEF DESCRIPTION OF THE DRAWINGS

The invention will be better understood and the above object as well as objects other than those set forth above will become more apparent after a study of the following detailed description thereof. Such description makes reference to the annexed drawings wherein:

FIG. 3 is a schematic view of the system shown in FIG. 2 with the protective shrouds covering each cradle being removed to show the opening in the support bracket through which each corresponding chock passes during transition to the operative position.

FIG. 4 is a schematic view of the system shown in FIG. 2 with the protective shrouds covering each cradle being removed to show the cradles in an inoperative or chock-stowed position.

FIG. 5 is a functional block diagram of the automatic chocking system of the present invention.

DESCRIPTION OF THE PREFERRED EMBODIMENT

With reference to the drawings, preferred embodiment of my new and improved automatic wheel choking system for vehicles will now be described in detail, it being understood that the foregoing detailed description is considered as illustrative only of the principles of the invention. Numerous modifications and changes will readily occur to those skilled in the art and therefore, it is not desired to limit the invention to the exact construction and operation shown and described. Accordingly, all suitable modifications and equivalents falling within the broad scope of the subject matter described herein may be resorted to in carrying out the present invention.

Figure 1:
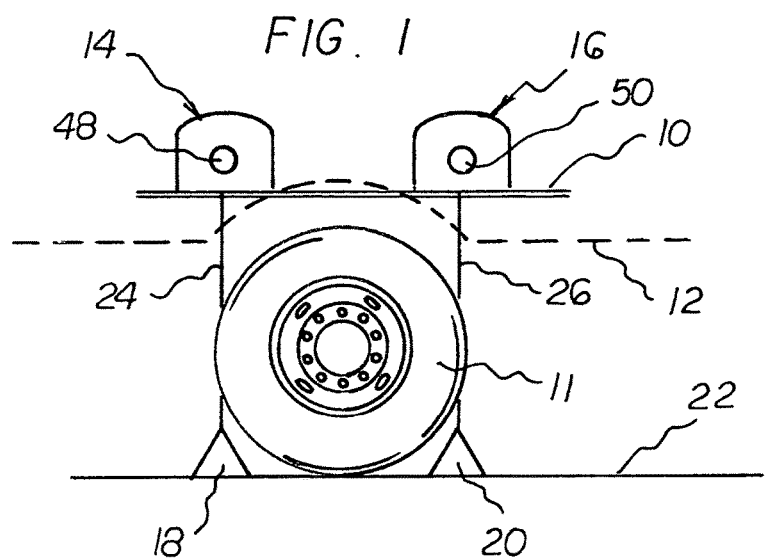
FIG. 1 is a schematic elevational view showing the automatic chocking system of the invention mounted on a truck chassis in the wheel well of the truck.

Substantially as depicted in FIGS. 1-4, a preferred embodiment of the invention is schematically depicted comprising a platform 10 suitably mounted on or affixed to the main frame or chassis of a large vehicle such as a truck (not shown) such that the platform 10 overlies the tandem wheel set 11 on the truck with the truck's corresponding fender line being schematically represented in FIG. 1 by the broken line 12. Platform 10 suitably supports a pair of juxtaposed chock housings 14, 16 which substantially are identical to one another. Each of the housings 14, 16 has associated with it respectively a separate chock assembly 18, 20 for engagement fore and aft of tandem tire set 11 when the chock assemblies are on the ground 22 in operative position.

A pair of tethers 24, 26 connects each chock assembly 18, 20, respectively, to an associated cradle or chock receptacle 44, 46 respectively located inside housings 14, 16 as will be explained in further detail.

Turning to FIGS. 3 and 4, each cradle housing 14, 16 is characterized by a protective outer shroud or cover 32, 34 suitably supported on a pair of opposed end plates 36, 38 and 40, 42. A first chock receiving-cradle generally represented by reference sign 44 is supported for rotation between opposed end plates 36, 38 whereas a second chock-receiving cradle 46 is supported for rotation between opposed end plates 40 and 42. Preferably, each cradle 44, 46 has a characteristic triangular-shaped transverse or V-shaped cross-section and is suitably sized to receive therein its associated wedge-shaped chocking member 18 and 20, respectively.

In accordance with the invention, each cradle 44, 46 suitably is adapted to rotate about an axis 48, 50 extending generally parallel to the axis defined by the axle of tandem tire set 11. To support the cradles for such rotation, a pair of opposed journal bearing members are suitably disposed on each pair of opposed end plates 36, 38 and 40 and 42. In FIGS. 3 and 4, the journal bearing members 52, 54 are depicted on end plates 36, 40, respectively, it being understood that similar journal bearing members (unsigned) are located on end plates 38 and 42, respectively.

More specifically, in accordance with the invention, each cradle 44, 46 is adapted to rotate about its corresponding axis 48, 50 between an inoperative chock-stowed position (FIG. 4) where the cradles are upright and the corresponding chocking member is nested therein, and an operative chock-deployed position where the cradle is rotated 180° with respect to its inoperative position such that the cradle is facing downward sufficient to allow the chocking member stowed therein to be lowered to the ground 22 (FIGS. 1-3) via attached tethers 24, 26. For this purpose, a pair of spaced, suitably sized and shaped openings 56 and 58 is disposed in platform 10 proximally below each cradle, respectively, substantially as depicted, to allow each chocking member 18 and 20 to descend there through upon the aforementioned 180° rotation of each corresponding cradle. Preferably, the bottom of each cradle has a flat plate 60 and 62 suitably affixed thereto which flat plate is suitably sized and dimensioned to cover and seal the respective openings 56, 58, when each cradle is in its inoperative chock-stowed position, substantially as shown in FIG. 4.

In accordance with another important feature of the present invention, operation of cradles 44 and 46 between their inoperative chock-stowed position and operative chock-deployment position preferably is carried out automatically by remote control using motive means responsive to the parking brake or other manually-activatable control located in the cab of the truck utilizing the chocking system of the invention. As schematically depicted in FIG. 2, the preferred motive means is a d.c. motor or servo-motor 64 supported on the chassis of the truck proximal to the platform 10, the output shaft of which motor is connected to cradles 44 and 46 via suitable transmission members or gearing indicated by broken lines 68, 71 and 73.

Motor 64 preferably is powered by the vehicle's electrical system (i.e. battery) and is controlled automatically in accordance with the functional block diagram of FIG. 5. As depicted in this block diagram, the parking brake control lever 66 is connected electrically to a parking brake sensor 70 which may comprise one or more conventional proximity sensors responsive to activation of the parking brake control lever. Sensor 70 thus is adapted to send electrical information signals to motor control system 72 indicative of the instantaneous condition of the vehicle's parking brake.

More specifically, parking brake sensor 70 is adapted to sense when the parking brake lever is engaged or "on," and/or when the parking brake lever is disengaged or "off," and to transmit a corresponding electrical signal, respectively, to the motor control system 72. The motor control system 72 is adapted to process the electrical information received from parking brake sensor 70 in the following manner.

Figure 2:
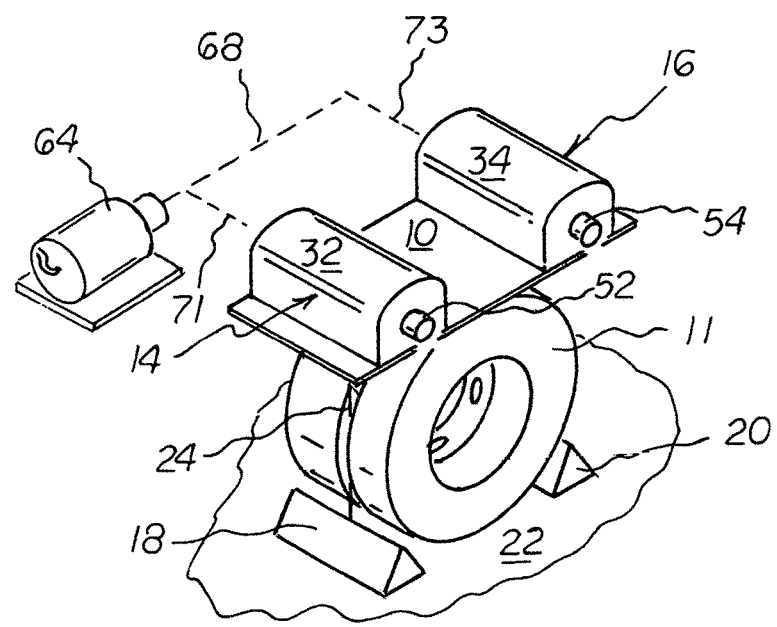
FIG. 2 is a perspective schematic view of the chocking system of the invention showing a motor for rotating the chock cradle between an operative positon and an inoperative position.

When the parking brake lever is engaged ("on"), a suitable signal is sent from sensor 70 through motor control 72 to motor 64 to cause the motor to rotate its output shaft sufficiently to cause cradles 44 and 46 to rotate about their axes 48 and 50 from an inoperative chock-stowed position to an operative chock deployment system which in turn causes the respective chock members 18 and 20 via tethers 24, 26 to descend through openings 56 and 58 in platform 10 under the influence of gravity to the ground 22 (FIGS. 1-3). In this condition the truck is prevented from moving or rolling.

Conversely, when the parking brake lever is released ("off"), a suitable signal is sent from sensor 70 through motor control 72 to motor 64 to cause the motor to reverse the rotation of its output shaft suitably to cause tethers 24 and 26 to be withdrawn inside cradles 44 and 46, respectively, thereby raising the chock members 18 and 20 until they ascend through openings 56 and 58 to be received within their corresponding respective cradles, and then subsequently causing the cradles to rotate about their axes 48 and 50 to an inoperative chock-stowed condition (FIG. 4). In this condition, the truck is unimpeded by any chocks and is able to move.

Battery 76 not only furnishes electrical power to motor 64 along line 78, but also provides electrical power to the parking brake sensor 70, and the motor control system 72 along connections 80 and 82, respectively. It will be appreciated that the motor control system 72 may include suitable arrangements of relays, limit switches, or other logic components well known in the art and necessary for carrying out the foregoing sequencing and control of motor 64 accordingly. In this regard, it will also be appreciated in respect of FIG. 5 that schematically depicted block 74 (labeled "chock system") comprises the aforementioned arrangement of the cradles 44, 46 supported on platform 10, as well as tethers 24, 26 and chocking members 18 and 20.

Finally, with respect to tethers 24 and 26 connecting chock members 18 and 20 to their respective cradles 44 and 46, respectively, it will be appreciated that these may comprise any suitable flexible wire, cable, rope, strap or the like, and that suitable mechanical winding assemblies such as axles, sprockets, spools, ratchet wheels or the like can be used to operatively connect the tethers to the cradles as will occur to those of ordinary skill in the vehicle chocking art.

As to the manner of usage and operation of the instant invention, the same is apparent from the above disclosure, and accordingly, no further discussion relative to the manner of usage and operation need be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A wheel chock apparatus for use with a vehicle having a chassis and a wheel, comprising:
 a chock member for engagement on the ground with said vehicle wheel,
 a receptacle for said chock member, said receptacle being mounted on a support member, said support member being mounted on said vehicle chassis above said wheel,
 a tether connected between said chock member and said receptacle,
 wherein said receptacle is adapted to be moved between a first inoperative position characterized by said chock member being received within said receptacle on said support member mounted above said wheel and a second operative position where said chock member is lowered to the ground from said receptacle via said tether to engage said vehicle wheel,
 further including a control system effective to transition said receptacle from said inoperative position to said operative position, said control system being responsive to remote operation of a vehicle's parking brake, and wherein said vehicle includes a parking brake control and said control system includes said parking brake control whereby activation of said parking brake control causes said control system to cause said receptacle to move between said first inoperative position characterized by said chock member being received within said receptacle on said support member mounted above said wheel and said second operative position where said chock member is lowered to the ground from said receptacle via said tether to engage said vehicle wheel.

2. The apparatus of claim 1 wherein activation of said parking brake control causes said control system to cause said chock member to be moved from said second operative position to said receptacle via said tether and to subsequently cause said receptacle to be moved to said first inoperative position characterized by said chock member being received within said receptacle on said support member mounted above said wheel.

3. The apparatus of claim 1 wherein said control system includes a proximity sensor responsive to the position of said parking brake control, said control system further includes a motor connected to said receptacle, said control system further including a motor control system responsive to said proximity sensor.

4. A wheel chock apparatus for use with a vehicle having a chassis and a wheel, comprising:
   a chock member for engagement on the ground with said vehicle wheel,
   a receptacle for said chock member, said receptacle being mounted on a support member, said support member being mounted on said vehicle chassis above said wheel,
   a tether connected between said chock member and said receptacle,
   wherein said receptacle is adapted to be moved between a first inoperative position characterized by said chock member being received within said receptacle on said support member mounted above said wheel and a second operative position where said chock member is lowered to the ground from said receptacle via said tether to engage said vehicle wheel, and
   wherein said support member includes a pair of opposed uprights, said receptacle being mounted on and between said uprights for rotation about an imaginary axis passing through said uprights, said support member further having an opening therein for defining a passage for said chock member.

5. The apparatus of claim 4 wherein said chock member is wedge-shaped, and said receptacle has a V-shaped cross-sectional shape sized sufficiently to receive therein said chock member.

6. The apparatus of claim 5 wherein said receptacle has a substantially flat bottom plate adapted to cover said opening in said support member when said receptacle is in said first inoperative position.

7. The apparatus of claim 1 wherein said support member being mounted on said vehicle chassis above said wheel further includes a second chock member for engagement on the ground with said vehicle wheel, a second receptacle for said second chock member, a second tether for connecting said second chock member to said second receptacle, said second receptacle being mounted on said support member in spaced relation to said first receptacle whereby said first chock member is adapted to engage a first side of said vehicle wheel and said second chock member is adapted to engage a second opposed side of said vehicle wheel.

* * * * *